United States Patent
Carr et al.

(10) Patent No.: US 7,159,623 B1
(45) Date of Patent: Jan. 9, 2007

(54) APPARATUS AND METHODS FOR ESTIMATING VEHICLE FUEL COMPOSITION

(75) Inventors: Mark D. Carr, Fenton, MI (US); Joseph R. Dulzo, Novi, MI (US); Christopher R. Graham, Lake Orion, MI (US); Richard B. Jess, Haslett, MI (US); Ian J. MacEwen, White Lake, MI (US); Onassis Matthews, Novi, MI (US); Jeffrey A. Sell, West Bloomfield, MI (US); Michael J. Svestka, Waterford, MI (US); Julian R. Verdejo, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/232,704

(22) Filed: Sep. 22, 2005

(51) Int. Cl.
*B65B 1/04* (2006.01)

(52) U.S. Cl. .................. 141/94; 141/198; 141/192; 123/516

(58) Field of Classification Search .................. 141/83, 141/94, 95, 192, 198; 123/497, 516, 41.31
See application file for complete search history.

(56) References Cited

U.S. PATENT DOCUMENTS 6,289,947 B1 * 9/2001 Heimbrodt et al. .......... 141/128
6,877,488 B1 * 4/2005 Washeleski et al. ........ 123/497
7,055,505 B1 * 6/2006 Washeleski et al. ........ 123/519

\* cited by examiner

*Primary Examiner*—Steven O. Douglas
(74) *Attorney, Agent, or Firm*—Christopher DeVries

(57) ABSTRACT

A method of estimating composition of fuel in the fuel tank of a vehicle. A refuel event is detected. Fuel consumption is monitored during a plurality of stages after the refuel event. A plurality of fuel trim shift values are determined relative to the stages. The fuel trim shift values are used to estimate a fuel composition change. This method eliminates a need for a hardware fuel composition sensor and also provides dynamic filtering of fuel trim values.

22 Claims, 5 Drawing Sheets

APPARATUS AND METHODS FOR ESTIMATING VEHICLE FUEL COMPOSITION

FIELD OF THE INVENTION

The present invention relates generally to vehicle fuel control, and more particularly to a system and method for estimating fuel composition in a vehicle fuel tank.

BACKGROUND OF THE INVENTION

Closed loop fuel control systems are commonly used in gasoline-powered vehicles to maintain an operating air-fuel (A/F) ratio at stoichiometry. Stoichiometric values, however, can vary with fuel composition. For example, when fuel is added to a vehicle fuel tank, it mixes with fuel already in the tank. For example, ethanol or gasohol in varying mixtures can be added to gasoline already in the tank. If the added fuel has a different composition from that of the fuel already in the tank, the engine of the vehicle may operate at a different stoichiometric value after the refueling. Currently manufactured vehicles may include a hardware sensor that senses and communicates ethanol content in fuel to other systems in the vehicle.

SUMMARY OF THE INVENTION

The present invention, in one implementation, is directed to a method of estimating composition of fuel in the fuel tank of a vehicle. A refuel event is detected. Fuel consumption is monitored during a plurality of stages after the refuel event. A plurality of fuel trim shift values are determined relative to the stages. The fuel trim shift values are used to estimate a fuel composition change.

In another implementation, a method of estimating composition of fuel in the fuel tank of a vehicle includes detecting a refuel event. A change in the fuel composition is estimated relative to an amount of fuel consumed after the refuel event. The estimating is performed using a fuel trim shift value. The estimating is performed one or more times until said estimated change in the fuel composition approaches or reaches a stable value.

In another implementation, the invention is directed to a system for estimating composition of fuel in the fuel tank of a vehicle having an engine. The system includes means for detecting a refuel event and means for scheduling a plurality of stages after the refuel event based on amounts of fuel consumption. The system also includes means for monitoring fuel consumption during the stages, means for determining a fuel trim adjustment to control a fuel-air ratio to the engine, and means for estimating a fuel composition change relative to one of the stages using the fuel trim adjustment.

In yet another implementation, the invention is directed to a system for estimating composition of fuel in the fuel tank of a vehicle having an engine. The system includes a control module that detects a refuel event. Using a fuel trim shift value, the control module estimates a change in the fuel composition relative to an amount of fuel consumed after the refuel event. The control module estimates the change until the estimated change approaches or reaches a stable value.

In still another implementation, a method of maintaining closed-loop control of fuel to a vehicle engine at stoichiometry includes determining a plurality of fuel trim shift values. The fuel trim shift values are filtered using a filter having a frequency that changes based on a frequency of an exhaust sensor of the vehicle. The filtered fuel trim shift values are evaluated using an O2 metric based on the exhaust sensor frequency.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

Figure 1:
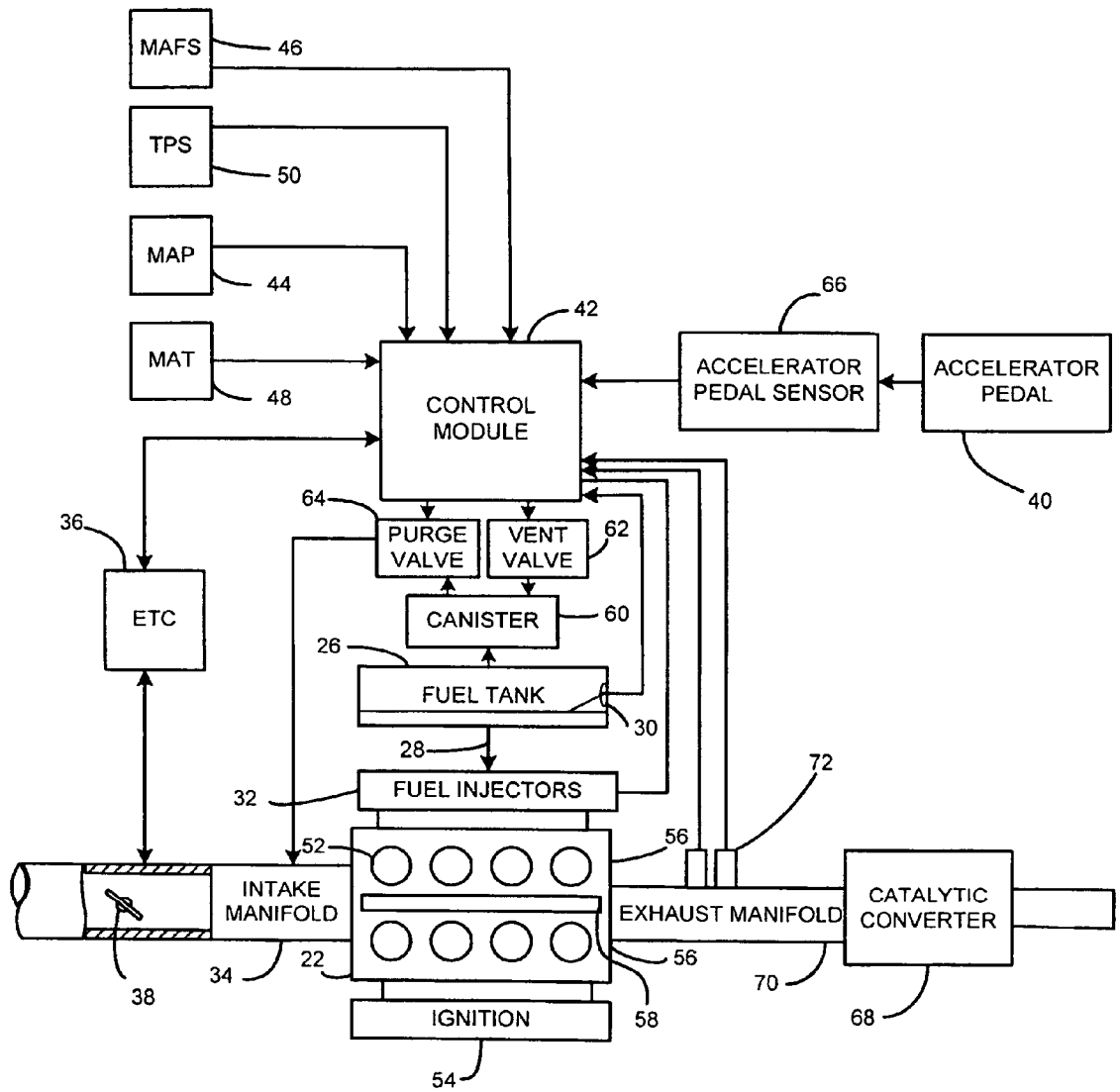
FIG. 1 is a functional block diagram of a vehicle including a fuel composition estimation system in accordance with one implementation of the present invention.

The following description of various embodiments of the present invention is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

The present invention, in one implementation, is directed to a method of estimating fuel composition, e.g., relative amounts of ethanol and gasoline, in a vehicle fuel tank. Generally, when a vehicle is refueled, a transition between existing and new fuel compositions happens at a nominally fixed rate when measured as a function of fuel consumed. Changes in fuel composition thus can be distinguished from fuel system faults, which generally happen either suddenly or very slowly. A slow fuel system fault may arise, for example, because of component aging. It is highly unlikely that a fuel system fault, when measured relative to fuel consumed, would occur at exactly the same rate as a fuel transition.

Referring now to FIG. 1, a vehicle including a fuel composition estimation system in accordance with one embodiment of the present invention is indicated generally by reference number 20. The vehicle 20 may be fueled with gasoline and/or ethanol in various percentages. Fuels appropriate for the vehicle 20 include but are not limited to "gasohol", which may include 90 percent gasoline and 10 percent ethanol as known in the art. Fuel is delivered to an engine 22 from a fuel tank 26 through a fuel line 28 and through a plurality of fuel injectors 32. A fuel sensor 30 senses a level of fuel in the tank 26 and communicates the fuel level to a control module 42. Air is delivered to the engine 22 through an intake manifold 34.

An electronic throttle controller (ETC) 36 adjusts a throttle plate 38 that is located adjacent to an inlet of the intake manifold 34 based upon a position of an accelerator pedal 40 and a throttle control algorithm that is executed by the control module 42. In controlling operation of the vehicle 20, the control module 42 may use a sensor signal 44 indicating pressure in the intake manifold 34. The control module 42 also may use a sensor signal 46 indicating mass air flow entering the intake manifold 34 past the throttle plate 38, a signal 48 indicating air temperature in the intake manifold 34, and a throttle position sensor signal 50 indicating an amount of opening of the throttle plate 38.

The engine 22 includes a plurality of cylinders 52 arranged in one or more cylinder banks 56. The cylinders 52 receive fuel from the fuel injectors 32 where it undergoes combustion in order to drive a crankshaft 58. Vapor from the fuel tank 26 is collected in a charcoal storage canister 60. The canister 60 may be vented to air through a vent valve 62. The canister 60 may be purged through a purge valve 64. When vapor is purged from the canister 60, it is delivered to the intake manifold 34 and burned in the engine cylinders 52. The control module 42 controls operation of the vent valve 62, purge valve 64, fuel injectors 32 and ignition system 54. The control module 42 also is connected with an accelerator pedal sensor 66 that senses a position of the accelerator pedal 40 and sends a signal representative of the pedal position to the control module 42.

A catalytic converter 68 receives exhaust from the engine 22 through an exhaust manifold 70. Each of a pair of exhaust sensors 72, e.g., oxygen sensors, is associated with a corresponding cylinder bank 56. The oxygen sensors 72 sense exhaust in the manifold 70 and deliver signals to the control module 42 indicative of whether the exhaust is lean or rich. The signal output of the oxygen sensors 72 is used by the control module 42 as feedback in a closed-loop manner to regulate fuel delivery to each cylinder bank 56, e.g., via fuel injectors 32. It should be noted that configurations of the present invention are also contemplated for use in relation to vehicles having a single bank of cylinders and/or a single exhaust manifold oxygen sensor.

In some implementations, the sensors 72 are switch-type oxygen sensors as known in the art. The control module 42 may use the sensor 72 feedback to drive an actual air-fuel ratio to a desired value, usually around a stoichiometric value. A plurality of predefined engine operating regions are referred to by the control module 42 in controlling fuel delivery to the engine 22. Operating regions may be defined, for example, based on speed and/or load of the engine 22. The control module 42 may perform control functions that vary dependent on which operating region of the vehicle is currently active.

Fuel, air and/or re-circulated exhaust to the engine 22 may be adjusted, i.e., trimmed, to correct for deviations from a desired air-fuel ratio. Trim values used to make such corrections may be stored in control module 42 memory locations corresponding to a plurality of predefined closed loop air-fuel ratio control cells (also referred to as sub-regions) associated with the operating regions of the vehicle 20. Cell values are used to provide closed-loop fuel, air and/or re-circulated exhaust control. For example, long-term multipliers (LTMs) may be used to provide long-term corrections to fuel commands to the engine 22 in response to changing engine conditions. LTMs typically are stored in a memory lookup table in non-volatile memory. The control module 42 adjusts LTMs periodically in accordance with a long-term time period, e.g., using a period that is longer than 1 second such as ten seconds. Such adjustment may be referred to as "long-term learning".

Additionally or alternatively, short-term integrators (STIs) may be used to provide short-term corrections to fuel commands to the engine 22 in response to engine conditions. The control module 42 adjusts STIs periodically in accordance with a short-term time period, e.g., using a period that is less than one second such as every 6.25 milliseconds. Such adjustment may be referred to as "short-term learning". A STI may be stored in volatile memory and may be adjusted based on an active cell LTM and a signal of the oxygen sensor 72.

In accordance with one implementation of the present invention, the control module 42 maintains a fuel trim memory structure for use in estimating fuel composition. A plurality of closed loop correction ("CLC") cells are associated with each cylinder bank 56. For example, eight cells may be provided for each bank 56. CLC cells are defined based on mass air flow to the engine 22 and may be used to record a total closed-loop fuel trim of the engine 22 at various operating conditions. The control module 42 stores baseline closed loop correction values for the engine operating regions in the CLC cells. Baseline CLC values may be updated when purge is commanded off as further described below. The baseline CLC values provide a basis for determining new fuel/air estimates.

CLC cell values are stored in non-volatile memory. A CLC value is obtained by multiplying LTM and STI corrections for an active closed-loop fuel control cell. In other configurations, CLC values may be combined in other ways. For example, a CLC value may be obtained in another configuration by adding LTM and STI corrections for an active closed-loop fuel control cell. In the present configuration, the control module 42 uses separate structures for closed loop fuel control and for fuel composition estimation. The structures are separate so that the fuel composition estimation structure may remain current over ignition cycles, even though the closed loop fuel control structure might be reset upon vehicle system power-up. It should be noted generally that configurations also are contemplated in which a vehicle control module may use a single memory structure for both closed loop fuel control and fuel composition estimation.

In one implementation, in order to estimate fuel composition, the control module 42 determines relative changes in fuel trim in terms of fuel/air (F/A). The control module 42 uses the fuel trim relative changes to estimate fuel composition following a refueling event. In one implementation of a method of estimating composition of fuel in the tank 26, a refuel event is detected. Fuel consumption is monitored during a plurality of learn stages after the refuel event, until an amount of fuel consumed after the refuel event exceeds a calibrated threshold. An ethanol estimate is calculated at the end of each learn stage. Each learn stage is scheduled as a function of fuel consumed after the refuel event. Purging of the canister 60 is commanded off during each learn stage, to prevent purge vapors from corrupting an ethanol estimate.

Figure 2:
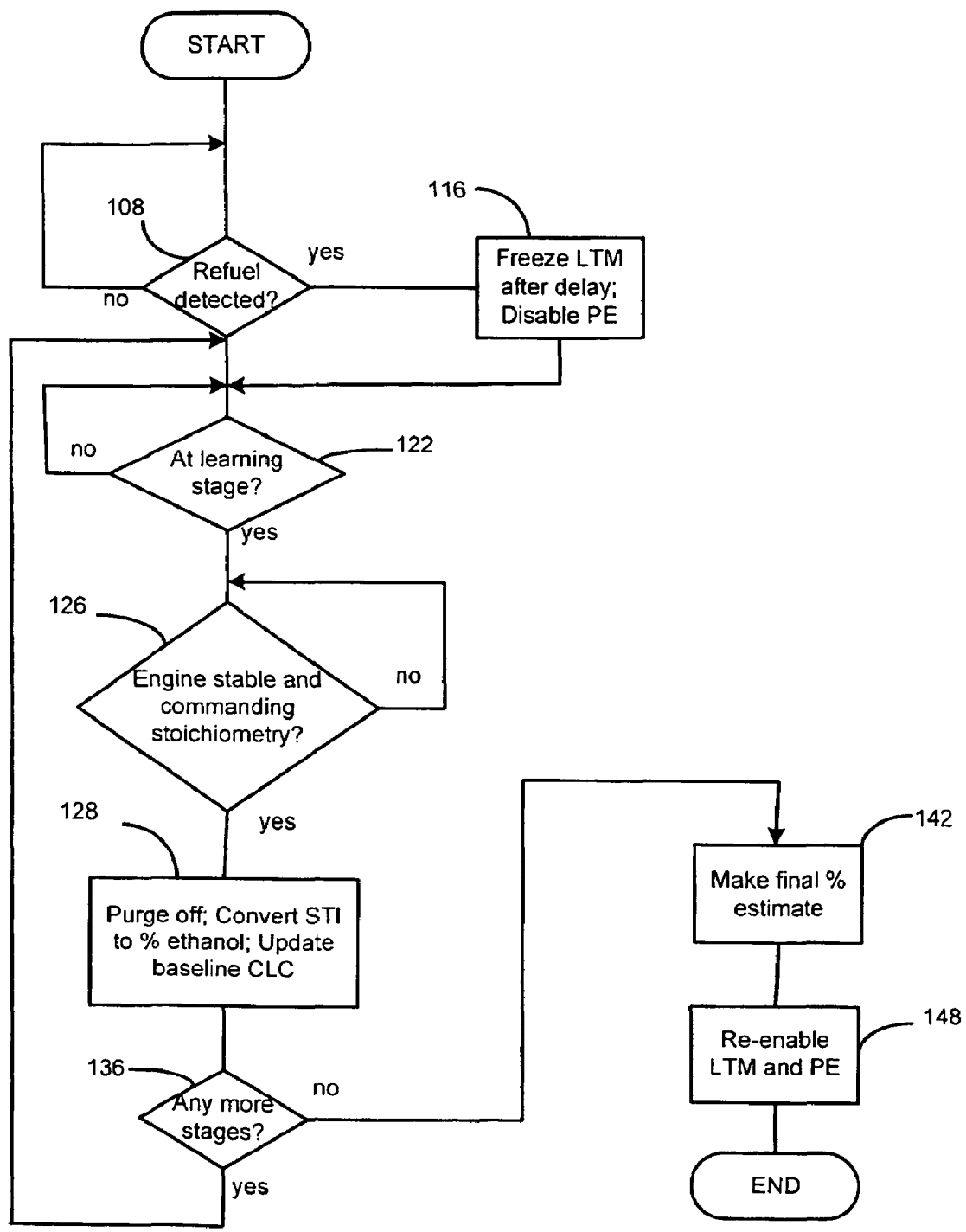
FIG. 2 is a flow diagram of a method of estimating composition of fuel in the tank of a vehicle in accordance with one implementation of the present invention.

A flow diagram of one implementation of the foregoing method is indicated generally by reference number 100 in FIG. 2. The method 100 is performed relative to each cylinder bank 56. In step 108 it is determined whether a refuel event is detected. If a refuel event is detected, control passes to step 116 in which updating of an LTM for the currently active closed-loop engine fuel control cell is disabled after a predetermined delay. LTM learning is disabled to prevent changes in fuel blend from being interpreted as changes in fuel trim. LTM learning disablement is delayed to a point preferably just before a new fuel blend reaches the engine 22. Such delay reduces or eliminates any possibility that a fuel trim fault occurring at or about the time of refueling might be interpreted and masked as a change in ethanol concentration. A mixing and transport delay before a fuel change reaches the engine 22 can be characterized consistently when expressed in terms of fuel consumed since detection of a refueling event. Such delay typically is about 0.2 to 0.25 liters.

Power enrichment mode also is disabled in step 116. In other configurations, other or additional operating modes, e.g., converter over-temperature protection and/or piston protection, may be disabled, provided such disablement is performed in a manner that prevents damage to the engine 22. While long-term learning is disabled, the STI is used to maintain stoichiometry and also to estimate ethanol concentration as further described below. Accordingly, fuel trim diagnostics provided for the vehicle 20 between the ethanol estimation stages are produced using the STI.

In step 122 it is determined whether fuel consumption has reached a level corresponding to a scheduled learning stage. If a learning stage is scheduled, in step 126 it is determined whether engine operating conditions are stable and the engine 22 is commanding stoichiometry. If yes, then in step 128 purge is commanded off for the duration of the stage. If stability conditions are not acceptable, then learning is postponed. Change in the fuel trim STI corresponding to a currently operating closed loop fuel control cell is converted into a fuel/air (F/A) ratio estimate and a relative ethanol percentage change as further described below. An O2 metric for the currently active CLC cell also is updated as further described below. The F/A ratio estimate, relative ethanol percentage change and/or 02 metric values may be used by the control module 42 in controlling a fuel/air ratio to the engine 22. A baseline CLC for a current CLC cell is updated in step 128.

At step 136 it is determined whether the current learning stage is the last scheduled stage. If the current stage is the last stage, in step 142 a final ethanol estimate and final O2 metric are determined. In step 148 LTM learning and power enrichment mode are re-enabled. If additional stages are scheduled, control returns to step 122.

Figure 3:
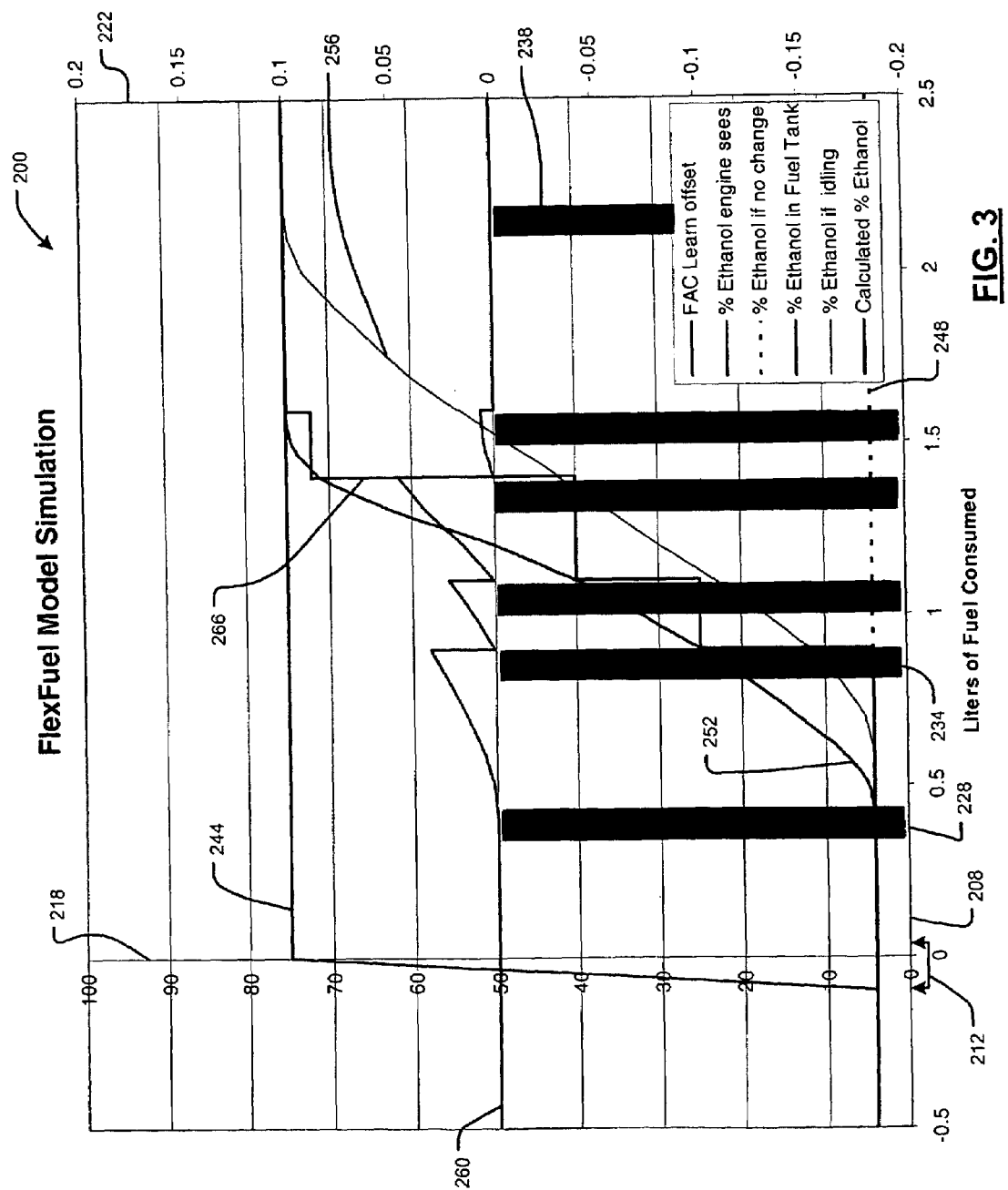
FIG. 3 is a graph of simulated ethanol learn stages in accordance with one implementation of the present invention.

An exemplary simulation of ethanol learn stages is indicated generally in FIG. 3 by reference number 200. An "x" axis 208 represents liters of fuel consumed after a refuel event 212. A primary "y" axis 218 represents percent ethanol. A secondary "y" axis 222 represents fuel trim shift from a nominal stoichiometric ratio of 1.

In one implementation, speed of the vehicle 20 and a fuel level of the fuel tank 26 are monitored to detect a refueling event. Upon detection of the refuel event 212 of the vehicle 20, a plurality of learn stages, e.g., six stages 228 as shown in FIG. 3, are scheduled based on fuel consumption 208, e.g., through a transition from old fuel to a new fuel blend. The stages 228 include a plurality of transitional stages 234 and one or more final stages 238 (one of which is shown in FIG. 3). Additional or fewer stages could be scheduled, depending on vehicle fuel capacity. Stages also may be scheduled to minimize sharp transitions between successive ethanol estimates.

During each stage 228, a change in a CLC cell value (specifically, change in a fuel trim STI combined with a frozen LTM) is converted into an ethanol percentage. A line 244 represents a percent of ethanol actually in the fuel tank 26. A line 248 represents a percent of ethanol that would be detected in the fuel tank 26 absent any change in ethanol from fuel previously in the tank. A line 252 represents a percent of ethanol "seen" by the engine 22. A line 256 represents a percent of ethanol "seen" by the engine 22 if idling. A line 260 represents CLC learn offsets from baseline CLC values, i.e., fuel trim shift from a stoichiometric value of 1. A line 266 represents a percent of ethanol being delivered to the engine 22, estimated by integrating the CLC learn offsets 260 and converting the result into an ethanol percentage via a look-up table.

During each stage 228, engine stability is monitored, for example, through changes in speed and/or air pressure, to ensure that an ethanol estimate is not made during transient conditions. Additionally, an O2 metric term is determined for each bank 56 based on the oxygen sensor 72 signal as further described below. During final stage(s) 238, a best ethanol estimate is made. Engine stability conditions applicable to final stages 238 may be more restrictive than stability conditions applicable to transition stages 234.

It should be noted that, in the present implementation, relative changes in fuel trim are used to estimate relative changes in stoichiometric fuel-air (F/A) ratio and, accordingly, to estimate relative changes in ethanol concentration. Linear calculations can be used to determine ethanol concentration based on F/A ratio. A F/A ratio thus is simpler to use, for example, than an A/F ratio to determine ethanol concentration. The control module 42 uses the CLCs to determine a F/A ratio. For a given engine operating region, a percentage change in a total closed-loop correction (i.e., combination of fuel trim STI and LTM as described above) corresponds directly to the same percentage change in stoichiometric F/A ratio.

An estimated F/A ratio may be determined in the following exemplary manner. A current CLC value is divided by the corresponding baseline CLC value to obtain a factor representing a percentage change. The product of the factor and a current value of the stoichiometric fuel/air ratio (F/A) yields a new value for the stoichiometric fuel/air ratio (F/A). The foregoing discussion is summarized as follows:

$$(F/A)\_new = (CLC\_present/CLC\_baseline) * (F/A)\_current$$

Fuel trim values determined as described herein typically are most useful when the engine 22 is operating at or near stoichiometry, as indicated by the oxygen sensor(s) 72. Under steady-state conditions, a sensor 72 switches consistently about the stoichiometric point and produces a sin-wave-like signal. If the engine 22 is subjected to a disturbance such as a throttle change, load change and/or torque change, the sensor 72 may deviate from its steady-state signal.

The control module 42 maintains an O2 metric derived from the bank oxygen sensor 72 signal. The O2 metric is used to quantify a degree to which closed-loop fuel/air ratio control maintains air and fuel to the engine 22 near stoichiometry. The O2 metric increases in value to indicate deviations from steady state by the sensor 72. As mentioned previously, the control module 42 monitors engine stability to ensure that an ethanol estimate is not made during transient conditions. Additionally, it is determined whether the O2 metric is below a predetermined maximum level before a fuel/air ratio estimate is made during a stage 228. The O2 metric has units of millivolts and reaches minimum values, e.g., approximately 250 to 300 mV, when the sensor 72 is switching repeatedly under ideal conditions.

An O2 metric for each bank 56 is obtained in the following manner. A closed-loop fuel control limit-cycle switching frequency is determined. The limit-cycle frequency is determined in terms of the bank oxygen sensor 72 signal. As further described below, closed-loop fuel-trim values may be filtered based on cycle events of the bank oxygen sensor 72 signal. A running determination of a recent plurality of (e.g., the most recent four) oxygen sensor cycles is used to obtain a period. The period is inverted to obtain a frequency.

As previously discussed, relative changes in fuel-trim are used to calculate a relative change in ethanol concentration and accordingly a stoichoimetric fuel/air ratio. Thus it is advantageous to provide appropriate filtering for fuel-trim values (for example, the STIs). In the present implementation, such filtering is dynamic. For example, a filter corner frequency may be used which is a multiple of the closed-loop operating frequency of the engine 22. A multiplier, e.g., between 12 and 18 typically may be used. Thus if the engine 22 is operating at a closed-loop frequency of 8 Hz, a filter corner frequency would be, for example, 144 Hz. As further described below, raw closed-loop corrections are first-order filtered using a filter coefficient of the O2 metric so that a representative mean value is captured. The main frequency component of an STI signal is the frequency of closed-loop fuel control, which is the frequency of the oxygen sensor 72. Thus the filter corner frequency used is a multiple of the closed-loop fuel control frequency.

Filtering is also used in generating the O2 metric. In one configuration, the O2 metric may be calculated by integrating values derived from the oxygen sensor 72 signal. In a preferred configuration, a first-order lag filter is applied to the oxygen sensor 72 signal to provide the O2 metric. When a sufficiently low corner frequency is selected for the filter, the filter performs in a manner similar to numerical integration. In the present configuration, the corner frequency used to provide the O2 metric is the same frequency as that used in filtering fuel-trim values, i.e., a multiple of the closed-loop operating frequency of the engine 22.

At or near the end of a stage 228, a temporary fuel/air ratio estimate (subject to upper and lower limits as further described below) is designated as the final value of the fuel/air ratio estimate corresponding to the particular stage 228. When the stage is a transitional stage 234, the final value corresponding to the stage 234 may be used as a current stoichiometric fuel/air ratio for controlling fuel to the engine 22. When the stage is a final stage 238, the final value corresponding to the stage 238 is stored and used to calculate a final ethanol estimate when all final stages are concluded.

In one configuration, a maximum of five final stages are attempted to be performed. If there are two "good" final stages in such attempts, a final estimate is made based on data from the two "good" attempts and the estimate is complete. Otherwise, five stages are completed to obtain a final estimate. A stage may be determined to be "good" based on the following conditions: fuel consumed during the stage exceeds a calibration value, purge duty cycle is below a calibration value, engine overrun conditions are not present, engine stability criteria have been satisfied for the final stage estimate, the current operating cell has been stable for a calibration time value, closed loop reset has not occurred on either bank for a calibration time value, and O2 metrics for both banks do not exceed a calibration value. Generally, an ethanol estimate is referred to as "in progress" when and after a refuel event is detected. The ethanol estimate is referred to as "complete" when the last of the final stage(s) is completed and/or the estimate is ended because the estimated ethanol percent is no longer changing.

During each stage 228, stability of the engine 22 is monitored by monitoring engine RPM change and manifold air pressure (MAP) change. The O2 metric is calculated based on the stability of the oxygen sensor 72 as another measure of control stability. An estimate made during each stage that corresponds to a minimum in the O2 metric is kept for use in closed-loop fuel control and other or additional vehicle control functions.

Baseline CLC values are updated periodically so that relative changes in fuel trim can be accurately determined. When a CLC cell value is updated, the corresponding value of the O2 metric at that particular time is saved in an array. Thus each CLC cell has both a CLC value (e.g., 1.043) and a corresponding captured O2 metric value (e.g., 324 mV). As time elapses, all captured O2 metric values are incremented, e.g., by 1 mV, at a calibrateable rate. When a particular captured O2 metric value degrades to a point of exceeding a calibrateable threshold, the corresponding cell is scheduled for an update. For example, if the vehicle 20 enters into a given CLC operating cell, a check is made to determine whether the corresponding captured O2 metric exceeds the threshold. If so, a request is made to command purge off and allow a CLC update to occur.

Additionally, a non-volatile variable (timer) is provided to track an amount of time the engine 22 has been operating. The timer increments while the engine is operating and decrements (but not below zero) while the engine is not operating. The timer is compared to a calibration to determine whether updating of baseline CLC values is allowed. In such manner, baseline CLC updating is prevented from being performed when the engine 22 is cold, to prevent long-term "drift" of ethanol estimates. CLC learning also is inhibited until a delay representing a transition of switching off the purge valve 64 has expired. The delay may be tracked in terms of fuel consumed.

Optimal Bank Selection

In one configuration, a final ethanol estimate is selected so as to promote long-term accuracy of such estimates as well as stability of the engine fuel-trim values near nominal (in the absence of an actual fuel trim fault). In the vehicle 20, a small discrepancy may tend to arise between ethanol estimates based on fuel trim data associated with one of the banks 56 and ethanol estimates based on fuel trim data associated with the other bank 56. Such discrepancy may have, for example, about a 3% maximum value in terms of fuel trim (i.e., between about 6 and 8 ethanol percentage points). The discrepancy is normal and typically due to noise inherent in the vehicle 20 in the presence of a plurality of external disturbances.

To address such discrepancies, optimal bank selection may be enabled in a vehicle having a plurality of cylinder banks. When optimal bank selection is enabled, the average fuel trim of the engine 22 is checked. If the average fuel trim is greater than nominal, the higher of two ethanol estimates (one associated with one bank 56 and the other with the other bank 56) is used. Similarly, if the average fuel trim is lower than nominal, the lower of two ethanol estimates is used. It should be understood that such estimates for both banks 56 are valid estimates, and either one could be used. When optimal bank selection is enabled, however, an estimate is selected that is determined to be more favorable for maintaining the long-term accuracy of the ethanol estimate and, simultaneously, the stability of fuel trim. In implementations in a vehicle having a single bank of cylinders and a single pre-catalyst oxygen sensor, an ethanol estimate that is determined to be most favorable for promoting long-term accuracy of the estimate and stability of fuel trim may be selected from ethanol estimates from each of a plurality of final stages.

Dead-band Logic

Figure 4:
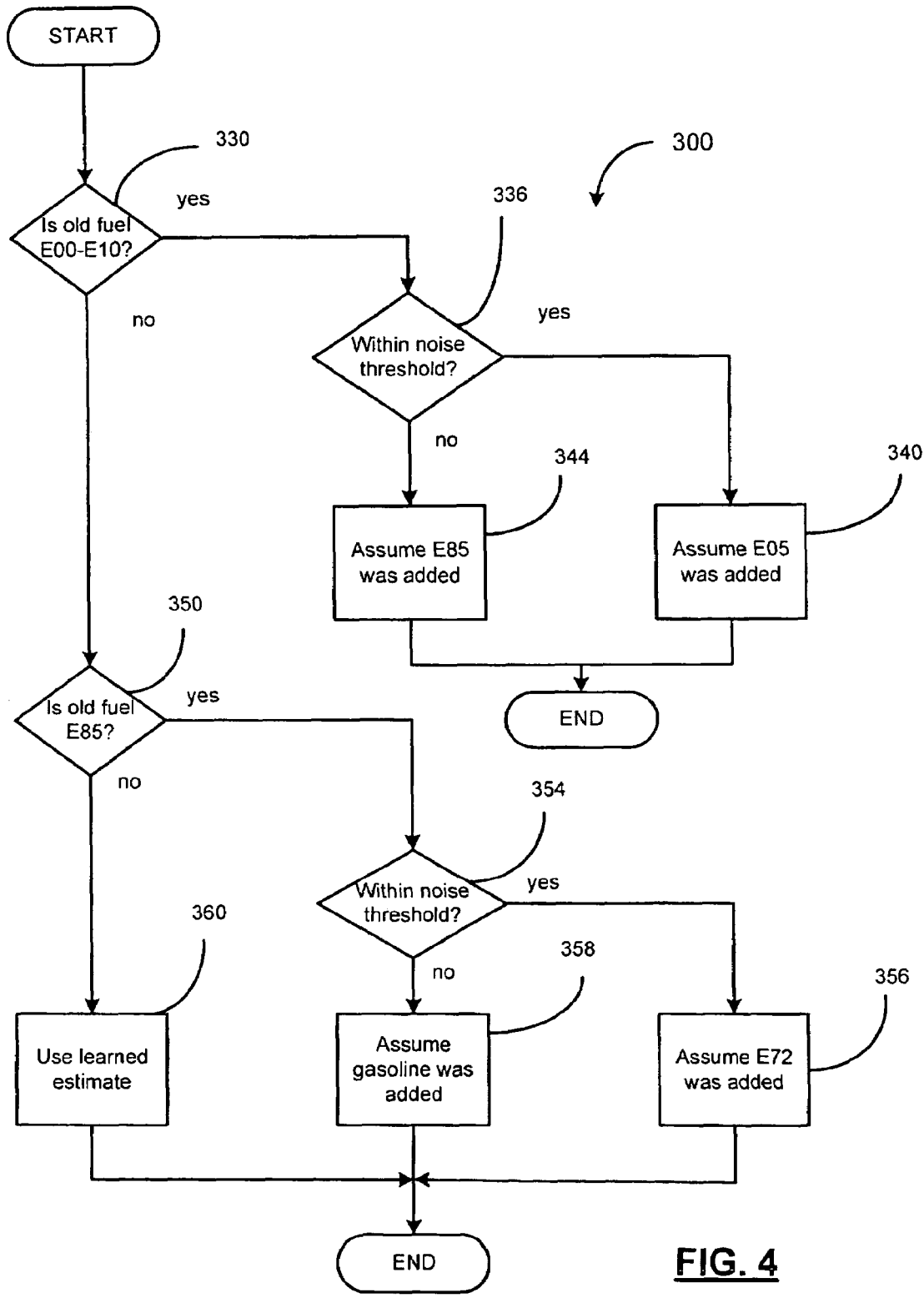
FIG. 4 is a flow diagram of a method of expediting an ethanol estimate in accordance with one implementation of the present invention.

When a final fuel/air estimate is made for a current learning stage 228, logic may be used to minimize learn error by limiting the estimate as follows. It is assumed that most vehicles use either gasoline or E85, i.e., a mixture of 85% ethanol and 15% gasoline. Accordingly, fuel composition in most fuel tanks tend toward one of the two combinations and would not persist at a middle percentage, say, E40. A flow diagram of a method of expediting an ethanol estimate is indicated generally in FIG. 4 by reference number 300. In step 330, it is determined whether fuel already in the fuel tank 26 before the refueling event ("old fuel") is gasoline (e.g., between E00 and E10). If the old fuel is not gasoline, then control passes to step 350. If the old fuel is gasoline, then in step 336 it is determined whether an observed percentage change in fuel trim values after the refueling event exceeds a predetermined noise threshold (e.g., +/−3.5% in terms of fuel trim). If the fuel trim values are within the noise threshold, then in step 340 it is assumed that E05 was added to the tank 26 during the refueling event. If the fuel trim values are not within the noise threshold, then in step 344 it is assumed that E85 was added to the tank 26 during the refueling event.

In step 350 it is determined whether the old fuel is E85. If the old fuel is not E85, then control passes to step 360. If the old fuel is E85, then in step 354 it is determined whether an observed percentage change in fuel trim values after the refueling event exceeds a predetermined noise threshold (e.g., +/−3.5% in terms of fuel trim). If the fuel trim values are within the noise threshold, then in step 356 it is assumed that E72 was added to the tank 26 during the refueling event. If the fuel trim values are not within the noise threshold, then in step 358 it is assumed that gasoline was added to the tank 26 during the refueling event.

In step 360 a current learned estimate is used. That is, a current estimate is set equal to the optimal fuel/air estimate as previously described if optimal bank selection is enabled. Otherwise the current estimate may be set to an average fuel/air estimate.

Estimate End Early Logic

In one implementation, it is determined whether an ethanol estimate should end before it reaches completion. Such determination is made based on a percent difference between the transition or final stage fuel/air estimate and the previously stored fuel/air estimate. An estimate may end early under the following conditions: the absolute percent difference between the two estimates is less than a calibration value (as a function of the learn stage), the ethanol estimate is currently in progress, the previous estimate is in a dead-band region and at least one new estimate was calculated during the transition or final stages. When the estimate is ended early, the previously stored stoichiometric fuel/air ratio is maintained.

Ethanol Learn Limitation

In one implementation, a fuel and/or air system fault that may be flagged by a fuel trim diagnostic is prevented from being learned as an ethanol percentage for estimating fuel composition. After a refuel event, maximum and minimum limits on ethanol percentage estimates are determined based on initial and final ethanol concentrations, ethanol concentration of fuel added at refueling, and initial and final fuel volumes. Estimation limits are determined based on the following relationships ("mixing calculations"):

$$x_{e3} = \frac{x_{e1}V_1 + x_{e2}(V_3 - V_1)}{V_3}$$

$$x_{e3} = x_{e1}(V_1/V_3) + x_{e2}(V_3/V_3 - V_1/V_3)$$

$$x_{e3} = x_{e1}k + x_{e2}(1-k) \text{ where}$$

$$k = \frac{V_1}{V_3},$$

and where $x_{e1}$ represents initial ethanol concentration, $x_{e2}$ represents ethanol concentration of fuel added, $x_{e3}$ represents final ethanol concentration, $V_1$ represents initial fuel volume, and $V_3$ represents final fuel volume. The ratio k varies between 0 and 1. Where k=0, a large refueling event could be inferred wherein a potential impact on ethanol change is strong and a final ethanol concentration would be dominated by $x_{e2}$. Where k=1, a mild refueling event could be inferred wherein a potential impact on ethanol change is weak and a final ethanol concentration would be dominated by $x_{e1}$.

Figure 5:
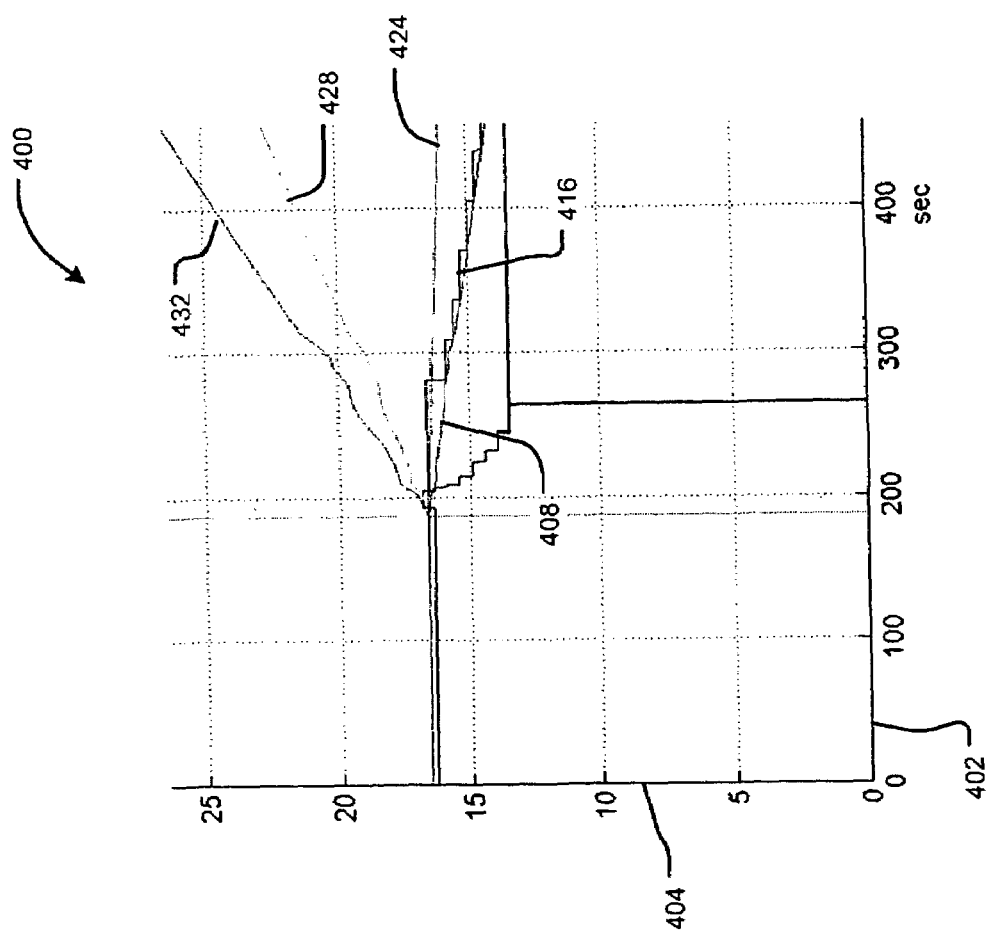
FIG. 5 is a graph of ethanol estimate limits determined in accordance with one implementation of the present invention.

In one implementation, maximum and minimum limits on ethanol percentage estimates are determined based on under-estimating k, to account for a potentially maximum change in ethanol that can be expected. For example, a graph of learn limits determined in accordance with one implementation of the invention is indicated generally in FIG. 5 by reference number 400. An x-axis 402 represents time and a y-axis represents ethanol percent. Output of the foregoing mixing calculations provides a value for a final ethanol concentration, assuming that E85 was added and assuming that E05 was added. Linear limits are calculated between two points in fuel consumed, i.e., starting and ending fuel consumed. The linear limits are used as bounds on ethanol percent. For example, a lower bound 408 of a minimum percent ethanol learn limit is shown below an ethanol estimate 416. An inner bound 424 of the minimum percent ethanol learn limit, an inner bound 428 of a maximum percent ethanol learn limit, and an upper bound 432 of the maximum percent ethanol learn limit also are shown. It should be noted that the bounds are linear relative to consumed fuel but nonlinear relative to time. The ethanol estimate 416 is clamped by bounds 408, 424, 428 and 432. Any portion of an STI that would have driven an ethanol estimate outside such bounds is subject to fuel trim diagnostics. In such manner, a fuel or air system fault can be prevented from being construed exclusively as an ethanol estimate.

Implementations of the foregoing system and method make it possible to reduce manufacturing and warranty costs for a vehicle by eliminating the need for a hardware fuel ethanol content sensor and its associated wiring and connector. Additionally, the foregoing O2 metric and dynamic filtering of fuel trim values makes it possible to estimate not only fuel composition with accuracy, but also to perform closed-loop fuel control, spark control, system diagnostics and other vehicle functions with increased accuracy.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of estimating composition of fuel in the fuel tank of a vehicle, said method comprising:
   detecting a refuel event;
   monitoring fuel consumption during a plurality of stages after the refuel event;
   determining a plurality of fuel trim shift values relative to the stages; and
   using the fuel trim shift values to estimate a fuel composition change.

2. The method of claim 1 further comprising scheduling one of said stages based on an amount of fuel consumed after the refuel event.

3. The method of claim 1 further comprising monitoring vehicle engine speed and fuel level change to detect the refuel event.

4. The method of claim 1 further comprising filtering the fuel trim shift values at a frequency based on a frequency of an exhaust sensor of the vehicle.

5. The method of claim 4 wherein the filtering frequency is a multiple of the exhaust sensor frequency.

6. The method of claim 1 further comprising determining a plurality of limits on a fuel composition estimate, said determining performed based on the following relationship:

$$x_{e3} = x_{e1}k + x_{e2}(1-k) \text{ where}$$

$$k = \frac{V_1}{V_3},$$

where $x_{e1}$ represents an initial fuel concentration, $x_{e2}$ represents a concentration of fuel added, $x_{e3}$ represents a final fuel concentration, $V_1$ represents an initial fuel volume, and $V_3$ represents a final fuel volume.

7. A method of estimating composition of fuel in the fuel tank of a vehicle, said method comprising:
   detecting a refuel event; and
   estimating a change in the fuel composition relative to an amount of fuel consumed after the refuel event, said estimating performed using a fuel trim shift value;
   said estimating step performed one or more times until said estimated change in the fuel composition approaches or reaches a stable value.

8. The method of claim 7 wherein said estimating comprises using a change in a fuel/air ratio relative to a baseline value to determine an ethanol percent change.

9. The method of claim 7 further comprising:
   scheduling a plurality of stages in which to perform said estimating step;
   performing said estimating step in one or more of the stages; and
   ending said estimating before performing said estimating step in all of the stages.

10. The method of claim 7 further comprising:
    freezing a closed-loop fuel control long-term multiplier; and
    using a short term integrator to control fuel trim while the long-term multiplier is frozen.

11. The method of claim 7 further comprising:
    determining an O2 metric based on a signal of an exhaust sensor of the vehicle; and
    performing said estimating step based at least partly on the O2 metric.

12. The method of claim 11 further comprising filtering said fuel trim shift value using a filter having a frequency that changes with a frequency of the exhaust sensor.

13. A system for estimating composition of fuel in the fuel tank of a vehicle having an engine, said system comprising:
    means for detecting a refuel event;
    means for scheduling a plurality of stages after the refuel event based on amounts of fuel consumption;
    means for monitoring fuel consumption during the stages;
    means for determining a fuel trim adjustment to control a fuel-air ratio to the engine; and
    means for estimating a fuel composition change relative to one of the stages using the fuel trim adjustment.

14. The system of claim 13 further comprising means for expediting the estimating means;
    wherein said expediting means causes said estimating means to estimate the fuel composition change as one of two predefined fuel compositions.

15. The system of claim 13 wherein said means for determining a fuel trim adjustment comprise means for measuring a degree to which a closed loop fuel control system of the vehicle controls air and fuel near stoichiometry.

16. The system of claim 13 wherein said estimating means makes estimates relative to fewer than all of the scheduled stages based on at least one previous estimate.

17. A system for estimating composition of fuel in the fuel tank of a vehicle having an engine, said system comprising a control module that:
    detects a refuel event; and
    using a fuel trim shift value, estimates a change in the fuel composition relative to an amount of fuel consumed after the refuel event;
    wherein said control module estimates the change until the estimated change approaches or reaches a stable value.

18. The system of claim 17 wherein the vehicle includes a plurality of cylinder banks, each bank associated with a corresponding exhaust sensor; wherein said control module uses a fuel trim shift value for each bank to estimate the change.

19. The system of claim 17 wherein said control module selects one of the bank fuel trim shift values based on maintaining long-term accuracy of the estimating.

20. A method of maintaining closed-loop control of fuel to a vehicle engine at stoichiometry, said method comprising:
    determining a plurality of fuel trim shift values;
    filtering the fuel trim shift values using a filter having a frequency that changes based on a frequency of an exhaust sensor of the vehicle; and evaluating the filtered fuel trim shift values using an O2 metric based on the exhaust sensor frequency.

21. The method of claim 20 further comprising:

monitoring fuel consumption in a plurality of stages after a refueling event;

determining the fuel trim shift values relative to the stages; and using the fuel trim shift values to estimate a fuel composition change.

22. The method of claim 21 wherein the fuel trim shift values comprise a frozen long-term multiplier and a short term integrator.

* * * * *